United States Patent
Kim

(10) Patent No.: US 9,489,452 B2
(45) Date of Patent: *Nov. 8, 2016

(54) IMAGE BASED SPAM BLOCKING

(71) Applicant: Dall Software Inc., San Jose, Round Rock, TX (US)

(72) Inventor: Bong Gyoune Kim, Santa Clara, CA (US)

(73) Assignee: DELL SOFTWARE INC., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/177,434

(22) Filed: Feb. 11, 2014

(65) Prior Publication Data

US 2014/0156678 A1    Jun. 5, 2014

Related U.S. Application Data

(63) Continuation of application No. 12/715,335, filed on Mar. 1, 2010, now Pat. No. 8,693,782, which is a continuation of application No. 12/651,299, filed on Dec. 31, 2009, now Pat. No. 8,718,318.

(60) Provisional application No. 61/142,108, filed on Dec. 31, 2008, provisional application No. 61/228,620, filed on Jul. 27, 2009.

(51) Int. Cl.
*G06K 9/34* (2006.01)
*G06F 17/30* (2006.01)
(Continued)

(52) U.S. Cl.
CPC ..... *G06F 17/30699* (2013.01); *G06K 9/00577* (2013.01); *G06K 9/325* (2013.01); *G06Q 10/107* (2013.01); *H04L 12/585* (2013.01); *H04L 51/12* (2013.01); *G06K 2209/01* (2013.01)

(58) Field of Classification Search
CPC .................. G06F 17/30699; G06K 9/00577; G06K 9/325; G06K 2209/01; G06Q 10/107; H04L 12/585; H04L 51/12
USPC ................ 382/176, 195, 192, 181; 707/748; 726/23, 1, 22; 709/206, 207, 224
See application file for complete search history.

(56) References Cited

U.S. PATENT DOCUMENTS 6,195,698 B1 * 2/2001 Lillibridge .............. G06F 21/31 709/203
7,406,503 B1 * 7/2008 Little, II .............. G06Q 10/107 709/206

(Continued)

FOREIGN PATENT DOCUMENTS

EP    2 216 947    8/2010

OTHER PUBLICATIONS

U.S. Appl. No. 12/651,299 Office Action mailed Sep. 4, 2013.
(Continued)

*Primary Examiner* — Mekonen Bekele
(74) *Attorney, Agent, or Firm* — Polsinelli LLP

(57) ABSTRACT

A fingerprint of an image identified within a received message is generated following analysis of the message. A spam detection engine identifies an image within a message and converts the image into a grey scale image. The spam detection engine analyzes the grey scale image and assigns a score. A fingerprint of the grey scale image is generated based on the score. The fingerprint may also be based on other factors such as the message sender's status (e.g. blacklisted or whitelisted) and other scores and reports generated by the spam detection engine. The fingerprint is then used to filter future incoming messages.

21 Claims, 5 Drawing Sheets

(51) Int. Cl.
*G06K 9/00* (2006.01)
*G06K 9/32* (2006.01)
*G06Q 10/10* (2012.01)
*H04L 12/58* (2006.01)

(56) References Cited

U.S. PATENT DOCUMENTS

| | | | | |
|---|---|---|---|---|
| 7,716,297 B1* | 5/2010 | Wittel | H04L 51/12 | 709/206 |
| 8,010,614 B1* | 8/2011 | Musat | G06Q 10/107 | 709/206 |
| 8,045,808 B2* | 10/2011 | Oliver | G06K 9/00463 | 382/203 |
| 8,126,835 B2* | 2/2012 | Van Lunteren | H04L 63/1408 | 706/48 |
| 8,214,438 B2* | 7/2012 | Mehr et al. | | 709/206 |
| 8,489,689 B1* | 7/2013 | Sharma et al. | | 709/206 |
| 8,693,782 B2* | 4/2014 | Kim | G06K 9/00577 | 382/181 |
| 8,718,318 B2 | 5/2014 | Kim | | |
| 2005/0041789 A1* | 2/2005 | Warren-Smith et al. | | 379/93.24 |
| 2005/0193073 A1* | 9/2005 | Mehr | H04L 51/12 | 709/206 |
| 2005/0216564 A1* | 9/2005 | Myers | G06K 9/00456 | 709/206 |
| 2005/0227678 A1* | 10/2005 | Agrawal | H04L 12/585 | 455/414.3 |
| 2006/0026242 A1* | 2/2006 | Kuhlmann | H04L 51/12 | 709/206 |
| 2006/0031318 A1* | 2/2006 | Gellens | G06Q 10/107 | 709/206 |
| 2006/0123083 A1* | 6/2006 | Goutte | G06Q 10/107 | 709/206 |
| 2007/0107059 A1* | 5/2007 | Chasin et al. | | 726/23 |
| 2008/0131005 A1* | 6/2008 | Oliver | G06K 9/00463 | 382/229 |
| 2008/0131006 A1* | 6/2008 | Oliver | G06K 9/00463 | 382/229 |
| 2008/0168144 A1* | 7/2008 | Lee | G06F 17/30707 | 709/206 |
| 2009/0030994 A1 | 1/2009 | Usher | | |
| 2009/0043853 A1* | 2/2009 | Wei | G06T 7/403 | 709/206 |
| 2009/0077617 A1* | 3/2009 | Levow | H04L 12/585 | 726/1 |
| 2009/0141985 A1 | 6/2009 | Sheinin et al. | | |
| 2010/0008579 A1* | 1/2010 | Smirnov | | 382/176 |
| 2010/0162403 A1* | 6/2010 | Dawson | G06F 21/552 | 726/26 |
| 2010/0246960 A1* | 9/2010 | Kim | G06K 9/00577 | 382/176 |
| 2010/0254567 A1 | 10/2010 | Kim | | |
| 2012/0281911 A1* | 11/2012 | Fung | G06K 9/00677 | 382/165 |

OTHER PUBLICATIONS

U.S. Appl. No. 12/651,299 Final Office Action mailed May 30, 2012.
U.S. Appl. No. 12/651,299 Office Action mailed Apr. 11, 2012.
U.S. Appl. No. 12/715,335 Office Action mailed Jun. 4, 2013.
U.S. Appl. No. 12/715,335 Final Office Action mailed Jul. 20, 2012.
U.S. Appl. No. 12/715,335 Office Action mailed May 1, 2012.

* cited by examiner

IMAGE BASED SPAM BLOCKING

CROSS-REFERENCE TO RELATED APPLICATIONS

The present application is a continuation and claims the priority benefit of U.S. patent application Ser. No. 12/715,335 filed Mar. 1, 2010, which is a continuation and claims the priority benefit of U.S. patent application Ser. No. 12/651,299 filed Dec. 31, 2009, which claims the priority benefit of U.S. provisional application 61/142,108 filed Dec. 31, 2008 and U.S. provisional application 61/228,620 filed Jul. 27, 2009, the disclosures of which are incorporated herein by reference.

BACKGROUND OF THE INVENTION

1. Field of the Invention

The present invention generally relates to image based spam blocking. More particularly, the present invention concerns generating a fingerprint for an image located within an image based electronic-mail message.

2. Description of the Related Art

Electronic-mail (email) security and maintaining that security occurs in a hostile environment. Spammers are constantly attempting to "beat the system" by coming up with new ways to avoid a determination that their message is spam. Spam detection is often based on the content of a message, for example, offers for a Rolex® watch or sales of Viagra® pills. By detecting messages that repeatedly use the terms Rolex or Viagra and/or those terms in the context of other information such as a phone number or email address, a determination might be made that a message is spam.

This determination is often made through parsing of the text of the message and identifying key words or words suggestive of spam content. These methods are not always effective and may result in a false positive that a message is spam. For example, a message might be an exchange between medical professionals concerning Viagra or a buyer purchasing a Rolex® watch from a seller via an online auction or shopping website such as eBay.com or Amazon.com.

Spammers have now begun to embed their spam messages (e.g. disruptive, unwanted, or unsolicited messages) in an image (image based spam). Image based spam is a message where the text is embedded in an image, which makes the message more difficult to parse than text or ASCII based messages. In some instances, a spammer will prepare a message, take a screen shot of the image, and embed the image in the message without any surrounding ASCII or text. Since there is no text to parse in the image based spam message, every word the spammer intends to convey remains illustrated in the image. Traditional spam detection techniques or filters cannot effectively detect or stop these image based spam messages.

Optical character recognition (OCR) may be used to identify words in a message. Similar to pure text-based parsing techniques, the words in the message are parsed and a determination is made as to whether the message is spam. OCR is, however, slow, computationally intensive, and easily fooled. For example, by rotating an image by only a few degrees where a line of text in an image now appears on a slant, the OCR recognition software may require additional computational cycles thereby delaying processing and/or result in incorrect character recognition, which may lead to failed recognition of the message as spam all together.

Spammers may also insert random noise such as dots or other background artifacts. Noise and artifacts make it difficult for OCR recognition techniques to identify the lines of text that may encompass a spam message. The human eye may process the content of the message without any issue, but computer imaging and processing techniques may not operate as well in the OCR context with such noise present.

Traditional spam filters or spam detection methods that assess the content of a message are thus proving to be ineffective against image based messages. There is a need for a context insensitive message detection technique that effectively detects and blocks image based spam messages.

SUMMARY OF THE PRESENTLY CLAIMED INVENTION

In a first claimed embodiment, a method for filtering an image based message is claimed. Through the method, an image based message is received from a sender. An image located within the received image based message is converted into a grey scale image, which is then analyzed to identify one or more text lines associated with the grey scaled image. A score is assigned to the grey scale image based on the presence or absence of a text line within the grey scale image. The image based message is then filtered based on the assigned score.

In a second claimed embodiment, a system for filtering an image based message is claimed. The system includes a processor that executes instructions, a spam detection engine executable by the processor, and memory. Execution of the spam detection engine by the processor converts an image located within the image based message into a grey scale image, analyzes the grey scale image to identify one or more text lines associated with the grey scale image, assigns a score to the grey scale image based on the presence or absence of a text line within the grey scale image, and filters the image based message based on the assigned score. The memory stores the aforementioned detection engine, grey scale image and assigned score.

In a third claimed embodiment, a computer-readable storage medium is claimed. The storage medium includes a computer program that is executable by a processor to perform a method for filtering an image based message. The method includes conversion of an image located within an image based message from a sender into a grey scale image, analysis of the grey scale image to identify one or more text lines associated with the grey scale image, assignment of a score to the grey scale image which is based on the presence of absence of a text line within the grey scale mage, and filtering of the image in the image based message based on the assigned score.

DETAILED DESCRIPTION

Figure 1:
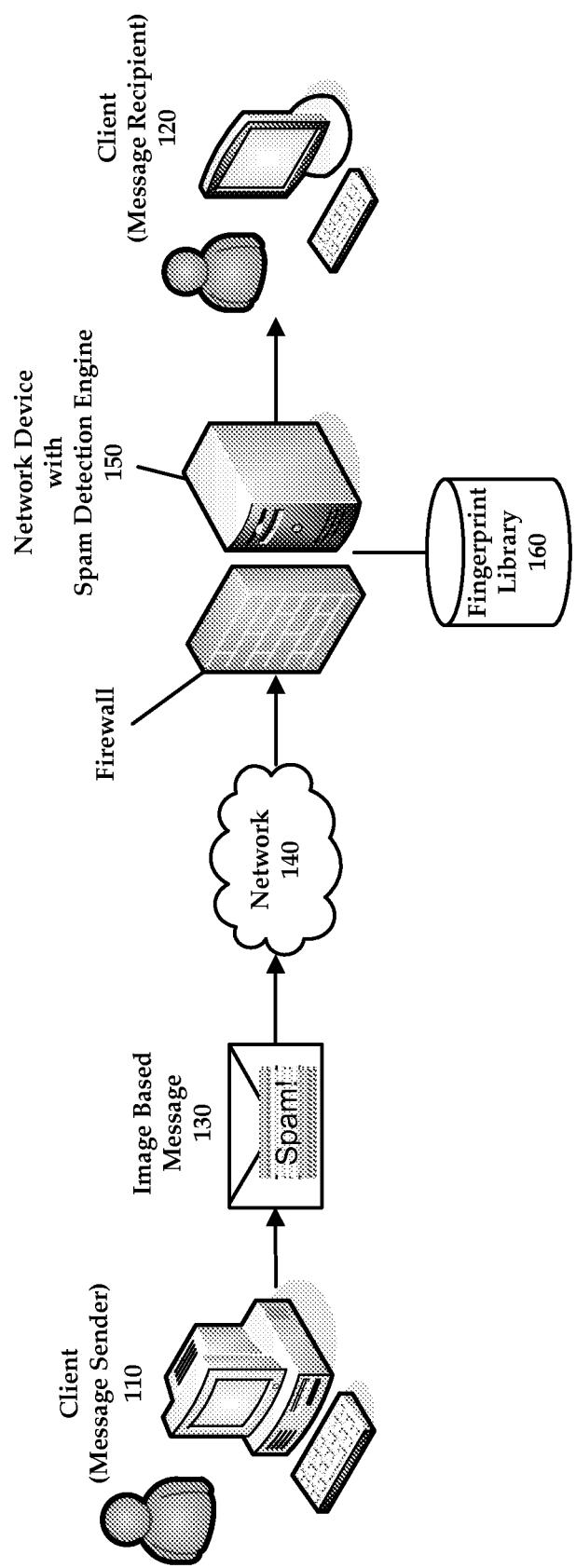
FIG. 1 illustrates an overview diagram of a spam detection system used to develop a fingerprint of an image based message.

FIG. 1 illustrates an overview diagram of a spam detection system 100 used to develop a fingerprint of an image based message. The spam detection system 100 of FIG. 1 includes clients 110-120, an image based message 130, network 140, spam detection engine 150, and fingerprint library 160.

Spam detection system 100 may comprise a plurality of clients. Clients 110 and 120 are inclusive of a general purpose computing device capable of accessing information over a network like the device illustrated in FIG. 5. Clients 110 and 120 may be implemented as computing devices such as workstations, servers, lap top computers, mobile devices, or other computing devices that can communicate over network 140. Clients 110 and 120 include software and/or hardware capable of sending and receiving messages.

Client 110, a message sender, may generate a message based on input received from a user. A message may include an email message (e.g. spam), instant message, text message, and/or any other electronically transmitted information. Client 110 may send a message over network 140 to client 120, a message recipient. Network 140 is inclusive of any communication network such as the Internet, Wide Area Network (WAN), Local Area Network (LAN), intranet, extranet, private network, or other network.

Spam detection engine 150 and its various components may be stored in memory and is executable by a processor of a network computing device to analyze a message 130 and determine whether the message 130 is a good message (solicited or wanted message) or spam message. The spam detection process and analysis is discussed in more detail in FIGS. 3-4 below. Spam detection engine 150 and the corresponding network computing device may be a stand-alone software and/or hardware component as illustrated in FIG. 1 and located behind a firewall. The spam detection engine 150 and corresponding network device may be an integrated enterprise system or integrated directly with client 120. Spam detection engine 150 may also be used in addition to or in connection with other spam detection services or software systems such as email filtering programs or server-side email filters.

In an exemplary embodiment of the present invention, an image embedded in an image based message is extracted from the message 130. The image is converted into a grey scale message and assigned a score by the spam detection engine 150. The message 130 may then be appropriately processed based on the score (e.g., delivered, deleted, or quarantined).

In other embodiments, a fingerprint is generated based in part on the score assigned to the grey scale image. A generated fingerprint may be stored in fingerprint library 160 for future use in identifying an incoming message as spam. In some embodiments, the contents of fingerprint library 160 may be shared amongst users of network 140 on a local or global scale. Fingerprint library 160 may be part of a database of the network device hosting the spam detection engine 150.

Figure 2:
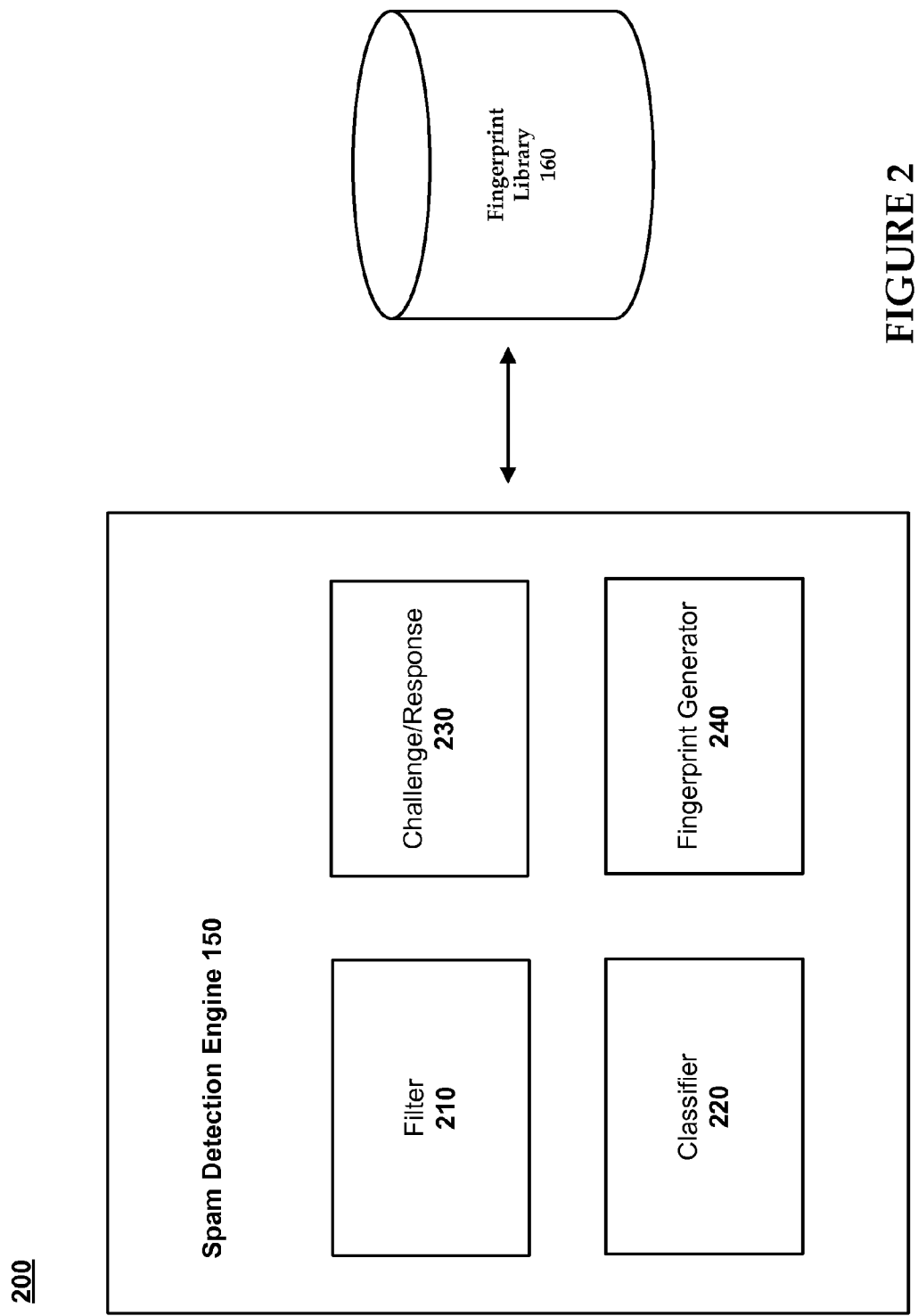
FIG. 2 illustrates a block diagram of the spam detection engine of FIG. 1.

FIG. 2 illustrates a block diagram 200 of the spam detection engine 150 of FIG. 1. Spam detection engine 150 is executable by a processing device to process and detect spam messages using one or more automated and/or manual message categorization, classification, filtering, and/or anti-spam techniques. Spam detection engine 150, which is stored in memory of the network device of FIG. 1 or an appropriate computing device, includes various modules such as filter 210, classifier 220, challenge/response 230, and fingerprint generator 240. Message 130 may be processed by any one component of spam detection engine 150 or any combination thereof. Spam detection engine 150 may by executable by a processing device to access and store data in a database such as fingerprint library 160. The database storing such a library 160 may be stored in memory of computing device Filter 210 is executable to process and organize a message based on specified rules or criteria and may be used to distinguish between a good message and spam message. Filter 210 may use any filtering technique known in the art such as country-based filtering, checksum-based filtering, hybrid filtering, or rule-based filtering techniques (e.g., content filtering or heading filtering). Filter 210 may also employ various DNS-based blacklists or other DNS-based anti-spam systems to block unwanted messages. A filtered message may be changed prior to delivery, blocked, deleted, redirected, or delivered to the client 120. Although a single filter is shown in FIG. 2, one or more filters may be used in other embodiments and the number of filters may vary for different implementations.

Classifier 220 is executable to process and classify a message 130 as a spam message, a good message, or some other category. Classifier 220 parses a message 130 to obtain various features associated with the message. Following parsing, a score based in part on whether the message is a good message or spam message is automatically calculated and used to classify the message 130. The score may also be based on a user input. For example, a user may indicate whether a particular message is a good message or spam message or whether a message sender should be blacklisted or whitelisted. Following processing or message classification by classifier 220, information relating to the classified message (e.g., a score) is stored in a database. The classifier 220 may be updated with the scores associated with particular messages for use in future classification of incoming messages. In one embodiment, classifier 220 utilizes a statistical filtering technique such as Bayesian filtering.

Classification of a message as a good message or spam message may also depend on whether message sender is listed as a valid sender (whitelisted) or invalid sender (blacklisted). A status of a message sender being whitelisted or blacklisted may be sufficient in classifying a message and authorizing delivery of the message 130 to client 120. Alternatively, message sender status may be one factor along with other factors to consider when classifying the message 130. The information relating to the classified message (e.g., score, message sender status) may also be used or considered by fingerprint generator 240 in developing a fingerprint of the message 130 as described in more detail below.

Classifier 220 may be a reliable statistical classifier like a statistical message classifier disclosed in U.S. patent publication number 2008/0097946, the disclosure of which is incorporated herein by reference. The reliable statistical classifier may be a whitelist classifier, collaborative fingerprinting classifier, an image analyzer, a probe account, a challenge response classifier, or any other classifier known in the art. A reliable good classifier or reliable junk classifier may be used while in other embodiments, the same classifier may classify both good and junk messages and may be machine classifiers, user-augmented classifiers, or a statistical classifier. Although a single classifier is shown in FIG. 2, one or more classifiers may be used in other embodiments and the number of classifiers may vary for different implementations. Classification may be improved by using multiple classifiers. A classified message may be changed prior to delivery, blocked, deleted, redirected, or delivered to the client 120.

Challenge/response module 230 processes an incoming message by subjecting the message or message sender to a test or series of tests. Passing the test allows delivery of the sender message. Challenge/response module 230 may test all incoming messages or only test the messages believed to be spam messages. Challenge/response module 230 may use human answerable or machine answerable challenge/response processes or any combination thereof like those described in U.S. patent application number 2008-0104188 A1 for "Message Auditing," the disclosure of which is incorporated herein by reference.

In some embodiments, the message sender (client 110) may have special software or hardware that enables it to automatically answer a challenge question and send its answer to an auditor such as a third-party server) that independently verifies the answer. As a result, the auditor generates and sends a report to the message recipient (client 120). The report may include the status of the message sender's address and/or information regarding whether the message sender's (client 110) answer to the challenge is correct.

Challenge/response module 230 may receive the report from the auditor and determine whether the message 130 should be delivered to the message recipient (client 120). The report derived from the challenge/response process may be saved in a database for the processing of future incoming messages. The report may also be used or considered by fingerprint generator 240 in developing a fingerprint for the message 130 as described in more detail below. Although a single challenge/response module is shown in FIG. 2, one or more challenge/response modules or systems may be used.

Fingerprint generator module 240 is executable to develop a fingerprint or spam profile of a message to aid in the processing of spam messages. After receiving a message 130 from client 110 via network 140, fingerprint generator 240 determines if the message 130 includes an image. If fingerprint generator 240 identifies an image within the message, the image is extracted from the message 130 and converted to a grey scale image using image processing software or any other technique known in the art. Conversion to a grey scale image eliminates background noise that can interfere with text detection since spammers often attempt to evade or deceive traditional text detection methods such as OCR by making text blurry or adding background noise. The use of a grey scale image with the present invention bypasses this possible impediment by focusing the analysis on the intensity of color.

After receiving a message 130 from client 110 and identifying any images present within the image, fingerprint generator 240 analyzes information about the content of the message 130 rather than content within the message. In one embodiment, fingerprint generator 240 uses edge detection or some other type of image processing or image analysis technique known in the art to identify any text lines, characters of text, and/or boundaries associated with the characters and the identified image.

Character boundaries, for example, may indicate the existence of text since a line of text tends to be uniform (much like a news article, headline, or normal message) through a particular line although the size and configuration of certain lines may change character throughout the course of a message. Thus, by identifying lines of text regardless of size, fingerprint generator 240 also identifies characteristics of the text that can be used to characterize or profile a message. For example, fingerprint generator 240 may detect and determine that five or more text lines within an image may be indicative of a spam message whereas a single line is not (e.g. a single line may be a caption or banner associated with a photo).

Fingerprint generator 240 may detect columns of text rather than lines. Fingerprint generator 240 may further or alternatively detect patterns of characters or words. For example, fingerprint generator 240 may detect the pattern or presence of 10 characters and 2 spaces followed by 6 characters and the pattern of 10 characters followed by 6 characters. Fingerprint generator 240 may find that the 10-2-6 pattern is indicative of a spam message whereas the 10-6 pattern is not. In another example, fingerprint generator 240 may identify and determine that a time/date stamp within an image (e.g. in the lower right hand corner) is acceptable and indicative of a good message where several lines of text in the lower right hand corner of an image is not.

Generally, an image based spam message contains more lines of text than a normal image such as a family photo or an image of outdoor scenery, and text lines often have higher contrast and more intensity than non text areas. In one embodiment, fingerprint generator 240 creates a histogram using the results of edge detection analysis. The histogram compares the number of non white pixels to the number of white pixels found in the grey scale image. Fingerprint generator 240 can identify groupings of pixels based on high contrast and intensity.

Fingerprint generator 240 may use the results of the histogram (e.g. groupings) to determine the presence or absence of text lines or characters appearing within the message 130. Fingerprint generator 240 then develops a fingerprint or spam profile based on characteristics of the received message such as the presence or absence of text lines or characters identified within an image of an image based message, or the number of text lines or characters identified (e.g. histogram). The generated fingerprint may be stored in fingerprint library 160 for future comparison and detection of incoming messages as spam messages.

The generated fingerprint may be based on the results of edge detection analysis alone or may also be based on other factors such as the data derived from filter 210, classifier 220, and challenge/response system 230. For example, fingerprint generator 240 may base a fingerprint on the message sender's status (e.g. blacklisted or whitelisted), the score assigned to a classified message, and/or the report generated following a successful or unsuccessful message challenge response process.

Fingerprint generator 240 determines the number of text lines associated with a particular image and stores that data in a database. For example, after collecting text line information for various images, fingerprint generator 240 can use that data to build a normal distribution of good images and spam images versus test lines. Fingerprint generator 240 can calculate mean and standard deviation values for numbers of text lines in good images and spam messages. Thus when a newly received image is analyzed, the number of text lines found within that image can be compared with the mean and standard deviation values for previous images stored in the database to help determine whether the newly received image is a spam message.

In one embodiment, fingerprint generator 240 may consider this information (i.e., whether the newly received image is a good message or spam message) when developing a fingerprint for the image. Alternatively, this information may be used to filter incoming messages using filter 210.

Figure 3:
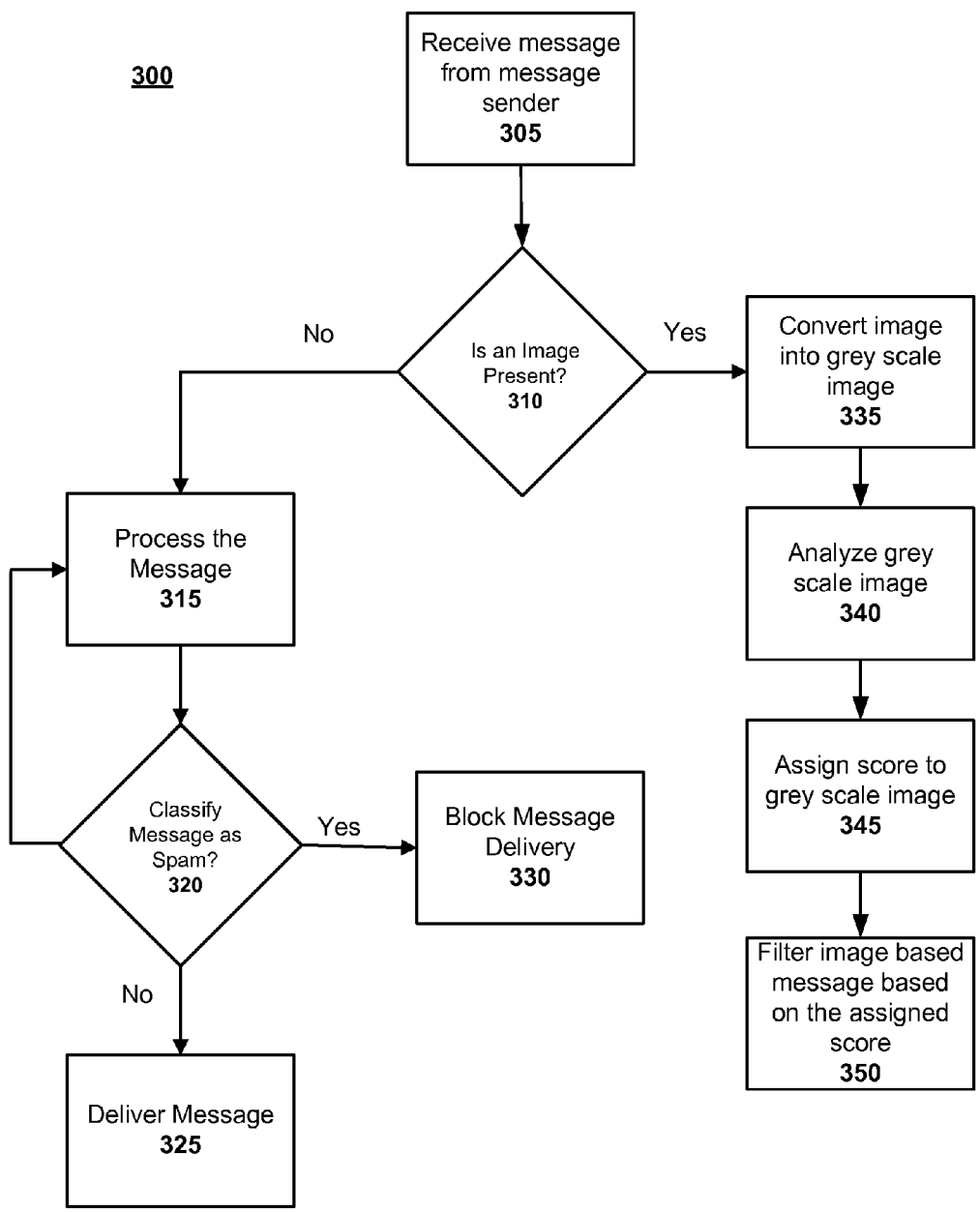
FIG. 3 is a flowchart illustrating a method for filtering a received image based message based on an assigned score.

FIG. 3 is a flowchart 300 illustrating a method for filtering a received image based message based on an assigned score. The steps of the process of FIG. 3 may be embodied in hardware or software including a computer-readable storage medium comprising instructions executable by a processor of a computing device. At step 305, spam detection engine 150 receives an incoming message 130 from client 110 via network 140. At step 310, spam detection engine 150 determines if an image is present in message 130. If an image is not present, spam detection engine 150 processes the message at step 315. For example, the message 130 is filtered by filter 210, classified by classifier 220, and/or subjected to a challenge/response process by challenge/response module 230 as described above. Following processing by spam detection engine 150, message 130 is classified as a good message or spam message at step 320. If the message is classified as a good message, the message is delivered to the message recipient at step 325. If the message is classified as a spam message, then delivery to the message recipient is blocked at step 330. Alternatively, message 130 may be classified in another appropriate category (not shown) or redirected for further processing by spam detection engine 150.

Returning to step 310, if an image is present within the received message, fingerprint generator 240 extracts the image from the message and converts the image into a grey scale image for further processing and analysis at step 335. At step 340, using edge detection techniques or other image processing or image analysis techniques known in the art, fingerprint generator 240 analyzes the grey scale image to identify the presence or absence of text lines or characters, characters of text, and/or boundaries associated with the characters in the identified image.

Fingerprint generator 240 may also identify columns of text and patterns of characters or words. Based on the presence or absence of text lines or characters and the numbers of text lines or characters identified within the image, fingerprint generator 240 assigns a score to the image at step 345. For example, a more negative score or a score less than zero may be indicative of a spam message. The score may also be based on other factors or data stored in memory and accessible by the spam detection engine 150 such as the message sender's status (e.g. blacklisted or whitelisted), a score assigned to a classified message, and/or the report generated following a successful or unsuccessful message challenge response process. The assigned score may be saved to a database 250 for future use and processing of messages (not shown). At step 350, filter 210 filters the message 130 based on the assigned score. Following filtering of the message 130, the message 130 may be changed prior to delivery, blocked, deleted, redirected, or delivered to the client 120 (not shown).

Figure 4:
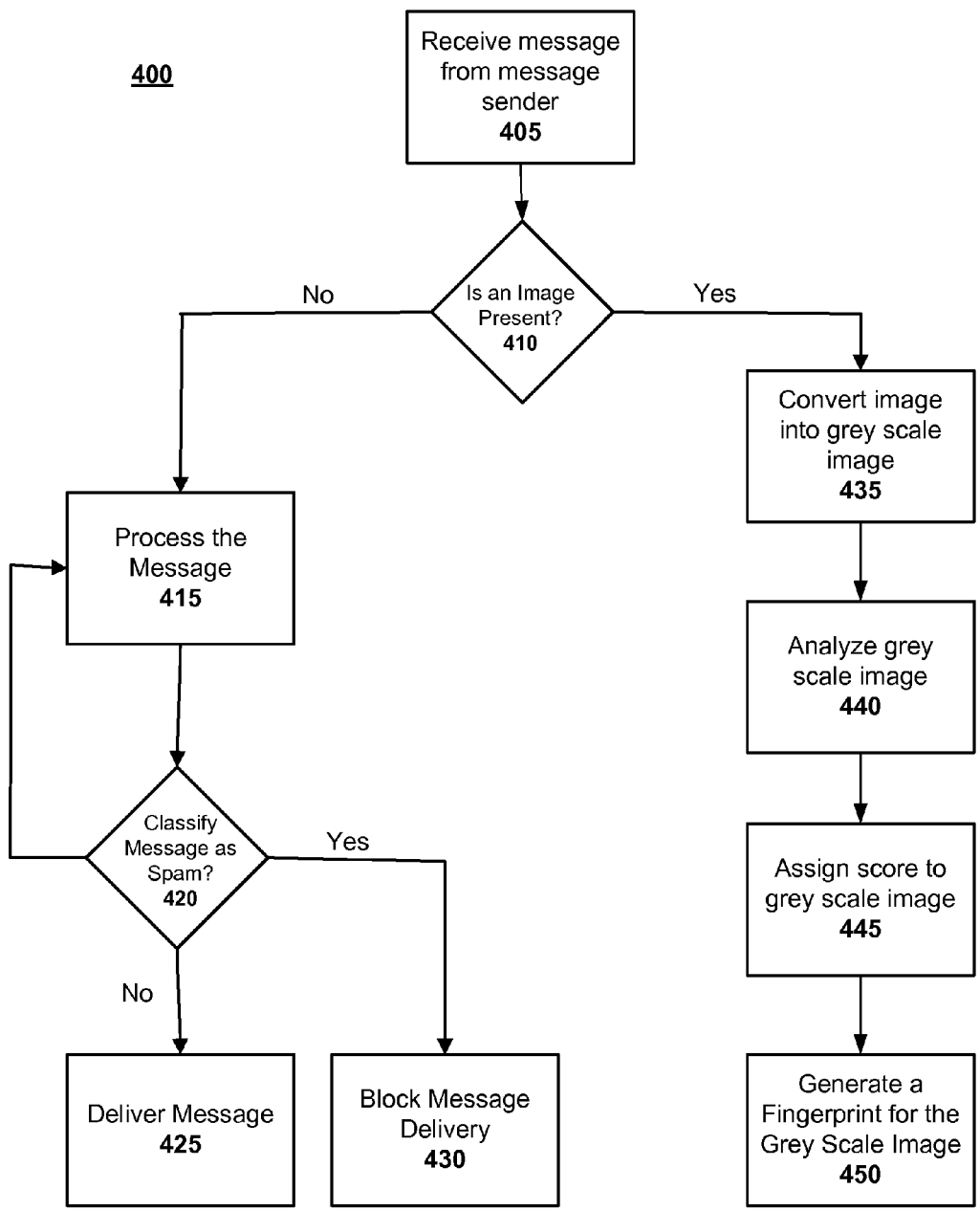
FIG. 4 is a flow chart illustrating a method for generating a fingerprint of an image in an image based message.

FIG. 4 is a flow chart 400 illustrating a method for generating a fingerprint of an image in an image based message. The steps of the process of FIG. 4 may be embodied in hardware or software including a machine-readable medium comprising instructions executable by a machine such as a processor of a computing device. At step 405, spam detection engine 150 receives an incoming message 130 from client 110 via network 140. At step 410, spam detection engine 150 determines if an image is present in message 130. If an image is not present, spam detection engine 150 processes the message at step 415. For example, the message 130 is filtered by filter 210 and/or classified by classifier 220 as described above. The message 130 may be subjected to a challenge/response process.

Following processing by spam detection engine 150, message 130 is classified as a good message or spam message at step 420. If the message is classified as a good message, the message is delivered to the message recipient at step 425. If the message is classified as a spam message, then delivery to the message recipient is blocked at step 430. Alternatively, message 130 may be classified in another appropriate category or redirected for further processing by spam detection engine 150.

Returning to step 410, if an image is present within the received message, fingerprint generator 240 extracts the image and converts the image into a grey scale image for further processing and analysis at step 435. At step 440, using edge detection techniques or other image processing or image analysis techniques known in the art, fingerprint generator 240 analyzes the grey scale image to identify the presence or absence of text lines or characters, characters of text, and/or boundaries associated with the characters in the identified image. Fingerprint generator 240 may also identify columns of text and patterns of characters or words.

Based on the presence or absence of text lines or characters and the numbers of text lines or characters identified within the image, fingerprint generator 240 assigns a score to the image at step 445. For example, a more negative score or a score less than zero may be indicative of a spam message. The score may also be based on other factors or data stored in memory and accessible by the spam detection engine 150 such as the message sender's status (e.g. blacklisted or whitelisted), a score assigned to a classified message, and/or the report generated following a successful or unsuccessful message challenge response process.

The score may also be based on other factors or data stored in memory and accessible by the spam detection engine 150 such as the message sender's status (e.g. blacklisted or whitelisted), the score assigned to a classified message, and/or the report generated following a successful or unsuccessful message challenge response process. The assigned score may be saved to a database for future use and processing of messages (not shown).

At step 450, fingerprint generator 240 generates a fingerprint for the grey scale image. The generated fingerprint may be based on the results of edge detection analysis alone (e.g. assigned score) or may also be based on other factors or data such as the message sender's status (e.g. blacklisted or whitelisted), the score assigned to a classified message, and/or the report generated following a successful or unsuccessful message challenge response process. Following fingerprint generation, filter 210 may filter the message 130 based on the generated fingerprint (not shown). The filtered message 130 may be changed prior to delivery, blocked, deleted, redirected, or delivered to the client 120.

Figure 5:
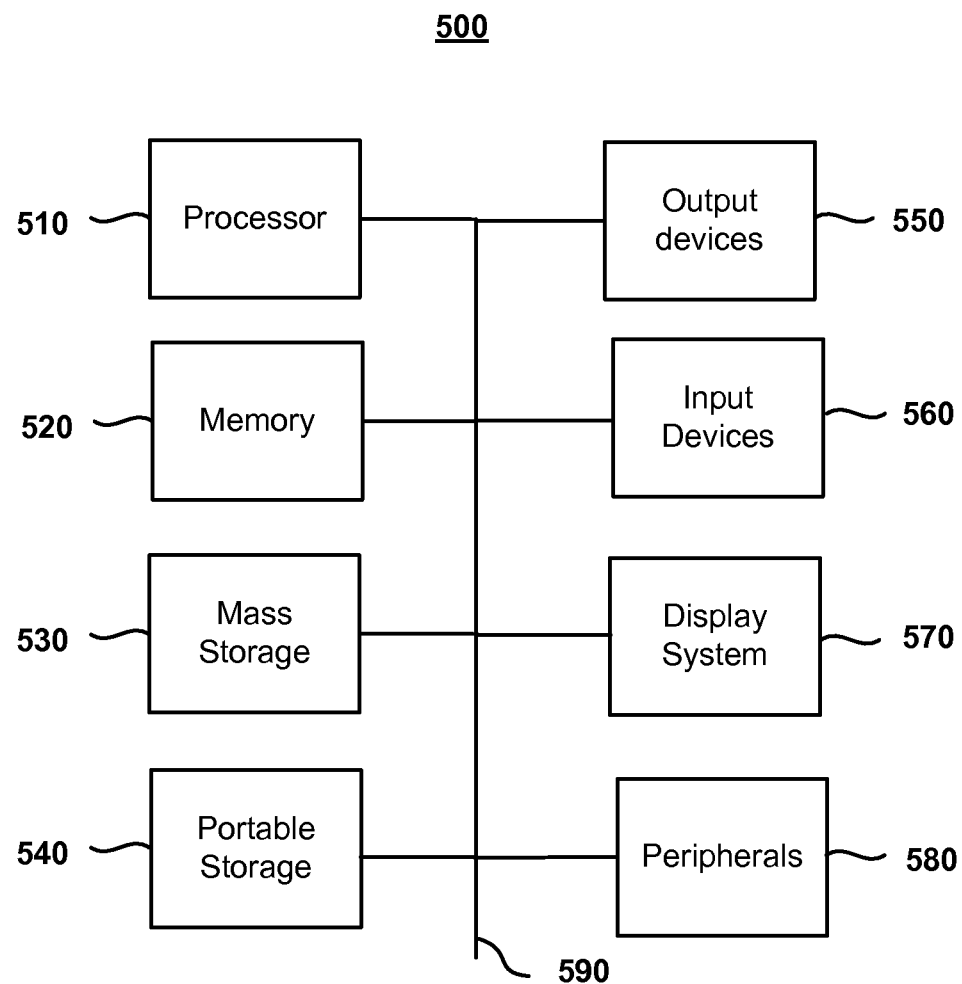
FIG. 5 illustrates a computing system that may be used to implement an embodiment of the present invention.

FIG. 5 illustrates a computing system that may be used to implement an embodiment of the present invention. System 500 of FIG. 5 may be implemented in the context of the system of FIG. 1. The computing system 500 of FIG. 5 includes one or more processors 510 and memory 520. Main memory 520 stores, in part, instructions and data for execution by processor 510. Main memory 520 can store the executable code when in operation. Main memory 520 also includes a database that may house a fingerprint library 160 (see FIG. 2). The database in main memory 520 may also store various data such as filtering rules or criteria, a score associated with a message 130, message sender status (e.g. valid or invalid, blacklisted or whitelisted, etc.), and a report generated from a message challenge/response process. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. The components, however, may be connected through one or more data transport means.

For example, processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading software into main memory 520.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for filtering image-based messages, the method comprising:
receiving an image-based message from a sender; and
executing instructions stored in memory, wherein execution of the instructions by a processor:
identifies via image analysis that one or more text lines are present within boundaries of an image of the image-based message,
identifies whether the one or more text lines identified as being present within the image fit a predetermined numeric pattern, the predetermined numeric pattern based on numeric character count values corresponding to numbers of consecutive characters and spaces,
assigns a score to the message based on whether the text lines fit the predetermined numeric pattern, and
filters the received image-based message based on the assigned score.

2. The method of claim 1, wherein execution of the instructions by the processor further converts the image into a grey-scale image.

3. The method of claim 1, wherein execution of the instructions by the processor further determines a number of the one or more text lines, wherein assigning the score is further based on the determined number of the one or more text lines.

4. The method of claim 1, wherein execution of the instructions by the processor further identifies one or more columns of text, wherein assigning the score is further based on the identified one or more columns of text.

5. The method of claim 1, wherein assigning the score is further based on a location of the identified one or more text lines within the image-based message.

6. The method of claim 5, wherein execution of the instructions by the processor further identifies that the one or more text lines comprise a date and/or time, wherein the assigned score based on the date and/or time indicates that the message is likely to be good.

7. The method of claim 1, wherein execution of the instructions by the processor further creates a histogram regarding pixel colors in the image.

8. The method of claim 7, wherein execution of the instructions by the processor further identifies groupings of pixels based on contrast and/or intensity.

9. The method of claim 1, wherein execution of the instructions by the processor further generates a profile of the image-based message based on the identified one or more text lines.

10. The method of claim 9, wherein execution of the instructions by the processor further stores the generated profile in a library in memory with other profiles, wherein the stored profiles are available for comparison with subsequent incoming messages.

11. A system for filtering image-based messages, the system comprising:
a communication interface for receiving an image-based message from a sender; and
a processor for executing instructions stored in memory, wherein execution of the instructions by the processor:
identifies via image analysis that one or more text lines are present within boundaries of an image of the image-based message,
identifies whether the one or more text lines identified as being present within the image fit a predetermined numeric pattern, the predetermined numeric pattern based on numeric character count values corresponding to numbers of consecutive characters and spaces, assigns a score to the message based on whether the text lines fit the predetermined numeric pattern, and filters the received image-based message based on the assigned score.

12. The system of claim 11, wherein the processor executes further instructions to convert the image into a grey-scale image.

13. The system of claim 11, wherein the processor executes further instructions to determine a number of the one or more text lines, wherein the score is further based on the determined number of the one or more text lines.

14. The system of claim 11, wherein the processor executes further instructions to identify one or more columns of text, wherein the score is further based on the identified one or more columns of text.

15. The system of claim 11, wherein the score is further based on a location of the identified one or more text lines within the image-based message.

16. The system of claim 15, wherein the processor executes further instructions to determine that the one or more text lines comprise a date and/or time, wherein the assigned score based on the date and/or time indicates that the message is likely to be good.

17. The system of claim 11, wherein the processor executes further instructions to creates a histogram regarding pixel color.

18. The system of claim 17, wherein the processor executes further instructions to identify groupings of pixels based on contrast and/or intensity.

19. The system of claim 11, wherein the processor executes further instructions to generate a profile of the image-based message based on the identified one or more text lines.

20. The system of claim 19, further comprising a library in memory for storing the generated profile with other profiles, wherein the stored profiles are available for comparison with subsequent incoming messages.

21. A non-transitory computer-readable storage medium, having embodied thereon a program executable by a processor to perform a method for filtering image-based messages, the method comprising:

receiving an image-based message from a sender;

identifying via image analysis that one or more text lines are present within boundaries of an image of the image-based message;

identifying whether the one or more text lines identified as being present within the image fit a predetermined numeric pattern, the predetermined numeric pattern based on numeric character count values corresponding to numbers of consecutive characters and spaces;

assigning a score to the message based on whether the text lines fit the predetermined numeric pattern; and filtering the received image-based message based on the assigned score.

* * * * *